(12) United States Patent
Saidi et al.

(10) Patent No.: US 7,060,238 B2
(45) Date of Patent: Jun. 13, 2006

(54) SYNTHESIS OF METAL PHOSPHATES

(75) Inventors: M. Yazid Saidi, Henderson, NV (US); Haitao Huang, Henderson, NV (US)

(73) Assignee: Valence Technology, Inc., Las Vegas, NV (US)

( * ) Notice: Subject to any disclaimer, the term of this patent is extended or adjusted under 35 U.S.C. 154(b) by 156 days.

(21) Appl. No.: 10/794,327

(22) Filed: Mar. 4, 2004

(65) Prior Publication Data
US 2005/0196334 A1   Sep. 8, 2005

(51) Int. Cl.
   *C01B 25/45* (2006.01)
   *H01M 4/58* (2006.01)
(52) U.S. Cl. ............... 423/306; 429/231.9; 429/231.95
(58) Field of Classification Search ................. 423/306
   See application file for complete search history.

(56) References Cited

U.S. PATENT DOCUMENTS

| | | | |
|---|---|---|---|
| 6,528,033 B1 | 3/2003 | Barker et al. | |
| 6,645,452 B1* | 11/2003 | Barker et al. | 423/306 |
| 6,730,281 B1 | 5/2004 | Barker et al. | |
| 2002/0059719 A1* | 5/2002 | Hosoya et al. | 29/623.1 |
| 2002/0086214 A1* | 7/2002 | Barker et al. | 429/232 |
| 2004/0005265 A1 | 1/2004 | Chiang et al. | |
| 2004/0072069 A1* | 4/2004 | Hong et al. | 429/221 |
| 2004/0126300 A1* | 7/2004 | Barker et al. | 423/306 |
| 2004/0175614 A1* | 9/2004 | Wurm et al. | 429/221 |
| 2004/0202935 A1* | 10/2004 | Barker et al. | 429/231.9 |
| 2004/0262571 A1* | 12/2004 | Barker et al. | 252/182.1 |
| 2005/0164084 A1* | 7/2005 | Adamson et al. | 429/220 |
| 2005/0255026 A1* | 11/2005 | Barker et al. | 423/306 |

* cited by examiner

*Primary Examiner*—Wayne A. Langel
(74) *Attorney, Agent, or Firm*—Cynthia S. Kovacevic; Roger A. Williams; Michael D. Ross

(57) ABSTRACT

The present invention relates to a method for preparing a metal phosphate which comprises milling in a carbonaceous vessel a lithium source, a phosphate source, such as $LiH_2PO_4$, and a metal oxide containing a metal ion wherein the metal ion is capable of being reduced, to produced a milled mixture and heating the milled mixture in an inert atmosphere at a temperature and for a time sufficient to form a metal phosphate wherein the metal ion of the metal oxide is reduced in oxidation state without the direct addition of a reducing agent to the starting materials. In another embodiment the present invention relates to a method for preparing a mixed metal phosphate which comprises milling a lithium source and a phosphate source, such as $LiH_2PO_4$, a metal oxide and another metal compound wherein at least one of the metal compounds contains a metal ion capable of being reduced to produce a milled mixture and heating the resulting milled mixture in an inert atmosphere at a temperature and for a time sufficient to form a mixed metal phosphate, wherein the oxidation state of at least one of the metal ions is reduced in oxidation state without the direct addition of a reducing agent to the reactants. It is another object of the invention to provide electrochemically active materials produced by said methods.

20 Claims, 2 Drawing Sheets

SYNTHESIS OF METAL PHOSPHATES

FIELD OF THE INVENTION

The present invention relates to the synthesis of metal phosphate compounds and mixed metal phosphate compounds useful as electrochemically active electrode materials in batteries, in particular in lithium ion batteries.

BACKGROUND OF THE INVENTION

The proliferation of portable electronic devices such as cell phones and laptop computers has lead to an increased demand for high capacity, long endurance light weight batteries. Because of this alkali metal batteries, especially lithium ion batteries, have become a useful and desirable energy source. Lithium metal, sodium metal, and magnesium metal batteries are well known and desirable energy sources.

By way of example and generally speaking, lithium batteries are prepared from one or more lithium electrochemical cells containing electrochemically active (electroactive) materials. Such cells typically include, at least, a negative electrode, a positive electrode, and an electrolyte for facilitating movement of ionic charge carriers between the negative and positive electrode. As the cell is charged, lithium ions are transferred from the positive electrode to the electrolyte and, concurrently from the electrolyte to the negative electrode. During discharge, the lithium ions are transferred from the negative electrode to the electrolyte and, concurrently from the electrolyte back to the positive electrode. Thus with each charge/discharge cycle the lithium ions are transported between the electrodes. Such rechargeable batteries are called rechargeable lithium ion batteries or rocking chair batteries.

The electrodes of such batteries generally include an electrochemically active material having a crystal lattice structure or framework from which ions, such as lithium ions, can be extracted and subsequently reinserted and/or permit ions such as lithium ions to be inserted or intercalated and subsequently extracted. Recently, a class of transition metal phosphates and mixed metal phosphates have been developed, which have such a crystal lattice structure. These transition metal phosphates are insertion based compounds like their oxide based counterparts. The transition metal phosphates and mixed metal phosphates allow great flexibility in the design of lithium ion batteries.

Examples of such transition metal phosphates and mixed metal phosphates include olivine $LiMPO_4$ compounds, wherein M is Fe, Mn or Co. Examples of the mixed metal phosphates include olivine compounds of the formula $LiMI_{1-x}MII_xPO_4$, wherein MI is selected from the group consisting of Fe, Co, and Mn or mixtures thereof and MII is selected from the group consisting of Mg, Ca, Zn, Ni, Co, Cu, Al, B, Cr, and Nb and x is from about 0.01 to about 0.15.

Although these compounds find use as electrochemically active materials useful for producing electrodes these materials are not always economical to produce. They may afford insufficient voltage, have insufficient charge capacity or exhibit low ionic conductivity. The present invention provides an economical method for producing metal phosphates and mixed metal phosphates with electrochemical properties which make them useful for producing electrodes and in particular cathodes. The metal phosphates and mixed metal phosphates produced in the present invention contain less residual carbon and therefore can produce materials of higher energy density then materials previously known.

SUMMARY OF THE INVENTION

The present invention relates to a method for preparing a lithium metal phosphate which comprises milling a lithium source, a phosphate source and a metal oxide in a carbonaceous vessel to produce a milled mixture and then heating the milled mixture in an inert atmosphere at a temperature and for a time sufficient to form a lithium metal phosphate wherein the metal ion of the metal oxide is reduced in oxidation state without the direct addition of a reducing agent. In another embodiment the present invention relates to a method for preparing a lithium mixed metal phosphate which comprises milling a lithium source, a phosphate source, a metal oxide and another metal compound in a carbonaceous vessel to produce a milled mixture and then heating the milled mixture in an inert atmosphere at a temperature and for a time sufficient to form a lithium mixed metal phosphate, wherein the oxidation state of at least one of the metal ions is reduced in oxidation state without direct addition of a reducing agent. It is another object of the invention to provide electrochemically active materials produced by said methods.

DETAILED DESCRIPTION

Figure 1:
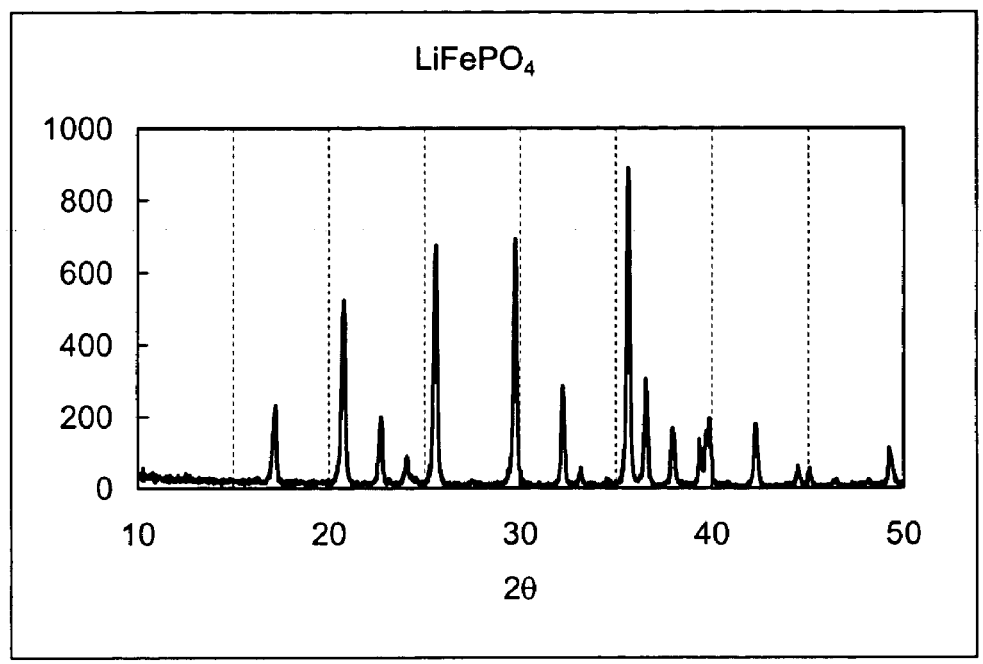
FIG. 1 is the XRD of $LiFePO_4$ produced by the method of the present invention showing that the product is in the olivine phase.

The present invention relates to methods for preparing metal phosphates and mixed metal phosphates. In another embodiment the present invention relates to electrochemically active materials produced by such methods.

Transition metal phosphates, and in particular lithiated metal phosphates have recently been introduced as electrode active materials for ion batteries and in particular lithium ion batteries. These transition metal phosphates are insertion based compounds. What is meant by insertion is that such materials have a crystal lattice structure or framework from which ions, and in particular lithium ions, can be extracted and subsequently reinserted and/or permit ions to be inserted and subsequently extracted.

The transition metal phosphates allow for great flexibility in the design of batteries, especially lithium ion batteries. Simply by changing the identity of the transition metal allows for regulation of voltage and specific capacity of the active materials. Two such transition metal phosphate cathode materials are $LiFePO_4$ and $LiFe_{1-x}Mg_xPO_4$ as disclosed in U.S. Pat. No. 6,528,033 B1 issued Mar. 4, 2003.

A class of compounds having the formula $AMPO_4$ is disclosed in U.S. Pat. No. 6,528,033 B1. Also disclosed are compounds having the formula $A_aMI_{1-x}MII_xPO_4$. The materials disclosed therein have good electrochemical activities. It is disclosed therein that $LiFePO_4$ can be prepared by mixing the reactants $Fe_2O_3$, $Li_2CO_3$, $(NH_4)_2HPO_4$ and carbon and heating said mixture in an inert atmosphere. The carbon is present in an amount sufficient to reduce the oxidation state of at least one metal ion of the starting materials without full reduction to the elemental state. The process disclosed therein is beneficial in that it employs the relatively inexpensive material $Fe_2O_3$. The carbon is present in an amount sufficient to reduce the $Fe^{3+}$ of the $Fe_2O_3$ to $Fe^{2+}$ found in the product. Previous methods for preparing $LiFePO_4$ required the use of the more expensive $Fe^{2+}$ salts, such as oxalate, acetate or FeO as the starting materials.

U.S. Pat. No. 6,528,033 B1 also discloses that $LiFe_{1-x}Mg_xPO_4$ can be prepared using $Fe_2O_3$. $LiFe_{1-x}Mg_xPO_4$ is prepared by mixing the reactants $LiH_2PO_4$, $Fe_2O_3$, $Mg(OH)_2$ and carbon and heating said reaction mixture in an inert atmosphere. The carbon again is present in an amount sufficient to reduce the oxidation state of at least one metal ion of the starting materials without full reduction to the elemental state. This process is also economical in that it employs $Fe_2O_3$ instead of the $Fe^{2+}$ salts It has now surprisingly been found that classes of compounds, similar to those disclosed in U.S. Pat. No. 6,528,033 B1 can be prepared wherein the oxidation of at least one metal ion of the starting materials is reduced without full reduction to the elemental state without the direct addition of a reducing agent, such as carbon or $H_2$. It has now surprisingly been found that using a carbonaceous vessel to mill the starting materials prior to heating affords materials, wherein at least one metal ion of the starting materials is reduced without the direct addition of carbon into the reactants. The materials formed by the present invention are very desirable for use as electrode active materials in that they have a smaller percentage of residual carbon and therefore will produce materials with an improved energy density.

In one embodiment of the invention an olivine metal phosphate of the formula $AMPO_4$, wherein A is Li (lithium) or Na (sodium) and M is selected from the group consisting of Fe (iron), Co (cobalt) and Mn (manganese), can be formed by milling in a carbonaceous vessel, a sodium or lithium source, a phosphate source and a metal oxide containing a metal ion of Fe, Co or Mn, wherein the metal ion is able to undergo reduction, to produce a milled mixture and heating said milled mixture to a temperature and for a period of time sufficient to produce $AMPO_4$ wherein the metal ion is reduced without full reduction to the elemental state, without the direct addition of a reducing agent to the reactants. In a preferred embodiment the olivine metal phosphate formed is of the formula $LiMPO_4$, wherein M is as defined above.

It has been found that materials so produced are pure and can be enhanced to exhibit good electronic conductivity when used as the active materials in electrodes, preferably as cathodes. The electroactive materials produced using such methods also contain a minimal amount of residual carbon. The materials produced by the method of the present invention contain residual carbon in an amount from about 0.05 weight percent to about 3 weight percent, preferably from about 0.5 to about 1 weight percent and more preferably about 0.5 weight percent. Electrodes produced using the active materials produced by the method of the present invention contain more active material and less residual carbon thereby having an increased energy density.

The present invention is beneficial over the process described in U.S. Pat. No. 6,528,033 B1 in that the process does not involve the direct addition of carbon or any other reducing agent, such as $H_2$, and the material produced is pure. Because there is a lower amount of residual carbon present in the materials produced by the methodology of the present invention these materials have a higher energy density. In addition, because of the higher energy density, this is beneficial in the manufacturing of the electrodes in that the thickness of the electrode can be reduced.

Sodium or lithium sources include, but are not limited to, $LiH_2PO_4$, $NaH_2PO_4$, $Li_2CO_3$, $LiOH$, $LiNO$, $Li_3PO_4$, $LiPO_3$, lithium oxalate and lithium polyacrylate. Sources containing both the sodium or lithium and the phosphate can serve as both the lithium (or sodium) source and the phosphate source.

The phosphate source can be part of the sodium or lithium source, as listed above or can include, but are not limited to, $NH_4H_2PO_4$ and $(NH_4)_2PO_4$.

The metal oxides are more specifically oxides of Fe, Co and Mn and include, but are not limited to, $Fe_2O_3$, $Co_3O_4$, $Mn_2O_3$, $Fe_3O_4$, FeO, CoO, $MnO_2$, and MnO.

The lithium or sodium compound source can also be the source of the phosphate. For example $LiH_2PO_4$ can be used in the reaction as both the lithium source and the phosphate source. In addition, some starting materials can serve as both the source of the phosphate and the source of the metal ion. By way of example, $Fe_3(PO_4)_2$ $8H_2O$ and $FePO_4$ $2H_2O$ can both serve as a metal ion source (Fe) and as the phosphate source.

The lithium or sodium compound, the metal compound and the phosphate compound are milled in a proportion which provides the stated nominal general formula. The starting materials are placed in a carbonaceous vessel, then ball milled to produce a milled mixture. The milled mixture is then heated in an inert atmosphere, whereby the lithium (or sodium), metal ions from the metal compounds and phosphate react to form the $AMPO_4$ product. In addition at least one metal ion is reduced without full reduction to elemental state. The materials so formed are then cooled at a fixed rate.

The term milling as used in the Examples refers to ball milling, a conventional method known to those skilled in the art. As used throughout the rest of the specification and in the claims, the term is meant to encompass processes similar to ball milling which would be recognized by those with skill in the art. For instance the starting materials can be blended together, put in a commercially available muller and then the reactants can be mulled. Alternatively, the starting materials are mixed in water or acetone by high shear, and/or using a pebble to mix the materials in a slurry form. The materials are then dried using a spray drying technique.

The starting materials are milled for about 8 hours to about 24 hours, preferably about 12 hours to about 24 hours and more preferably about 12 hours. The amount of time required for milling is dependent on the intensity of the mixing. For instance in small testing equipment the milling takes a longer period of time than is needed in industrial equipment.

The reaction takes place in an inert atmosphere, such as nitrogen ($N_2$) or argon (Ar). The reaction temperature ranges from about 650° C. to about 1000° C., preferably from about 700° C. to about 900° C. and more preferably at about 750° C. The heating period is from about 4 hours to about 48 hours, preferably from about 4 to about 24 hours and more preferably from about 4 to about 8 hours and most preferably about 4 hours. The heating rate is typically about 2° C. per minute.

The reaction temperature and heating period are chosen to be sufficient for the reactants to react according to, for example, the following reaction:

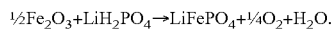

Since the reaction occurs in an inert atmosphere, devoid of oxygen, it is believed, without being limited thereto, that the generation of this partial pressure of oxygen is important to the formation of the olivine phase material LiFePO$_4$. It is believed that the generation of this partial pressure of oxygen at a proper temperature provides the active energy for the oxide transferring the metal ion to the phosphate. Ellingham diagrams establish a relationship between the O$_2$ partial pressure and the temperature at which a reduction can occur. By way of example, if one were to synthesize the LiMPO$_4$ according to the method of the present invention under a N$_2$ atmosphere, except that the N$_2$ atmosphere was not pure but contained some residual oxygen, then the reduction would take place at a higher temperature then it would if the N$_2$ atmosphere were pure, because of the presence of the residual oxygen.

Preferably the materials after they are heated to produce the AMPO$_4$ are then cooled slowly at a fixed rate. Preferably, the materials are cooled at a rate of about 2° C. per minute to about 3° C. per minute. More preferably the materials are cooled at a rate of 2° C. per minute.

The vessel used for milling in the above embodiment is made of a carbonaceous material. A carbonaceous vessel is made of a carbon containing material or preferably of a hydrocarbon material. Typical vessels made of carbonaceous materials are made of polymeric or plastic materials, including, but not limited to polypropylene, HDPE and those polymeric materials disclosed in U.S. Pat. No. 6,528,033 B1. Without being limited hereby, it is believed in theory that when the starting materials are milled in the carbonaceous vessel, that there is an abrasion of the vessel wall which abrasion acts as an in situ introduction of small quantities of the carbon containing material or the hydrocarbon material into the milled mixture. The introduction of a source of carbon or hydrocarbon material into the milled mixture, adds a sufficient amount of carbon or hydrocarbon material, for the carbon or hydrocarbon material to act as a reducing agent in the reaction. Yet only a low percentage of such carbon or hydrocarbon material is added so that the materials formed have a minimum amount of residual carbon. The materials produced by the method of the present invention contain residual carbon in an amount from about 0.05 weight percent to about 3 weight percent, preferably from about 0.5 to about 1 weight percent and more preferably about 0.5 weight percent.

As used herein the term "vessel" refers to any size or shaped container suitable for carrying out the milling process.

In preferred embodiments this invention relates to a method of preparing LiFePO$_4$, LiCoPO$_4$ and LiMnPO$_4$.

In a particularly preferred reaction Fe$_2$O$_3$ is mixed with LiH$_2$PO$_4$ in acetone in a carbonaceous vessel and ball milled. The milled mixture is then fired under N$_2$. The product formed is LiFePO$_4$ in the olivine phase. The XRD of the product so formed is shown in FIG. 1. The product formed is a pure material which although it is insulating, one skilled in the art would readily recognize modifications that could be made to the materials that would make pure material conductive when used in an electrode.

In another embodiment of the invention an olivine mixed metal phosphate of the formula AMI$_{1-x}$MII$_x$PO$_4$, wherein A is Li (lithium) or Na (sodium), MI is selected from the group consisting of Fe (iron), Co (cobalt) and Mn (manganese) or mixtures thereof, MII is selected from the group consisting of Mg (magnesium), Ca (calcium), Zn (zinc), Ni (nickel), Co (cobalt), Cu (copper), Al (aluminum), B (boron), Cr (chromium) and Nb (niobium) and x is from about 0.01 to about 0.15, can be formed by milling in a carbonaceous vessel, a sodium or lithium source, a phosphate source, a source of an ion of Fe, Co or Mn, and a source of a metal ion of Mg, Ca, Zn, Ni, Co, Cu, Al, B, Cr and Nb, wherein at least one of the metal ions is able to undergo reduction, to form a milled mixture, and heating the resulting milled mixture at a temperature and for a period of time sufficient to reduce the oxidation state of at least one metal ion without full reduction to the elemental state, without the direct addition of a reducing agent to the reactants. In a preferred embodiment the olivine mixed metal phosphate formed is of the formula LiMI$_{1-x}$MII$_x$PO$_4$, wherein MI, MII and x are as defined above.

It has now been found that materials so produced exhibit good electronic conductivity, in particular when used as the active materials in electrodes, preferably as cathodes. The electroactive materials produced using such methods contain a minimal amount of residual carbon. The materials produced by the method of the present invention contain residual carbon in an amount from about 0.05 weight percent to about 3 weight percent, preferably from about 0.5 to about 1 weight percent and more preferably about 0.5 weight percent. The materials produced using the active material produced by the method of the present invention contain more active material and less residual carbon thereby having increased energy density.

The present invention is beneficial over the process described in U.S. Pat. No. 6,528,033 B1 in that the present process does not involve the direct addition of carbon or any other reducing agent such as H$_2$, and the material so produced is conductive. Because there is a lower amount of residual carbon present in the materials produced by the methodology of the present invention these materials have a higher energy density. In addition because of the higher energy density, this is beneficial in the manufacturing of the electrodes in that the thickness of the electrode can be reduced.

Figure 2:
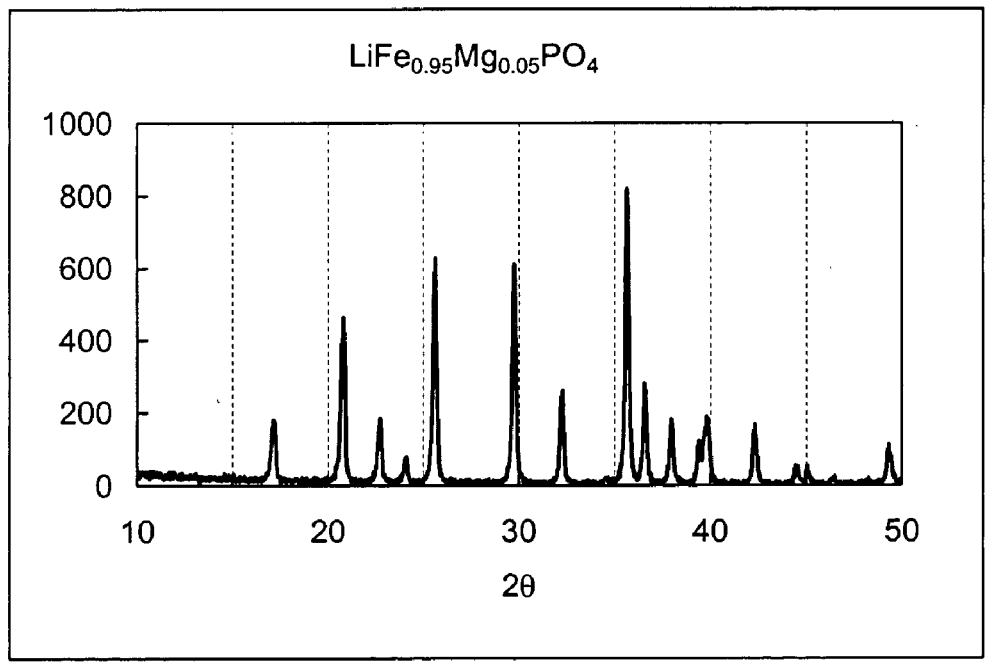
FIG. 2 is the XRD of $LiFe_{0.95}Mg_{0.5}PO_4$ produced by the method of the present invention showing that the product is in the olivine phase.

It has now additionally been found that, in contrast to the preparation of the LiFePO$_4$ described in detail above, that the replacement of part of the Fe$_2$O$_3$ with a Mg compound such as magnesium hydroxide, magnesium carbonate, magnesium acetate or magnesium oxide in the reaction of Fe$_2$O$_3$ mixed with LiH$_2$PO$_4$ significantly improves the olivine formation of a material of the formula LiFe$_{1-x}$Mg$_x$PO$_4$. Without being limited thereby, it is believed this is so because the partial release of O$_2$ in the reaction described above is reduced to a quarter or less. In addition the use of the magnesium changes the properties of the material produced from insulating to at least semi-conducting (10$^{-5}$ scm$^{-1}$ at 5 at. % substitution). As a result, the practical capacity of the product is over 140 mAh/g at C/5 (5 hour) rate with the total amount of carbon on the electrode produced from such material being as low as only 4%. The XRD of the LiFe$_{1-x}$Mg$_x$PO$_4$ product so formed is shown in FIG. 2. This XRD indicates that the product is an olivine phase and a highly pure compound.

The Mg compound can alternatively be substituted with a compound containing a metal ion selected from the group consisting of Ca, Zn, Ni, Co, Cu, Al, B, Cr and Nb to promote the formation of the olivine phase and improve the electronic conductivity of the products so formed. Compounds of the formula $LiCo_{1-x}MII_xPO_4$ and $LiMn_{1-x}MII_xPO_4$ can also be prepared using this methodology without the direct addition of reducing agents. The Mg, Ca, Zn, Ni, Co, Cu, Al, B, Cr and Nb compounds can replace for instance the $Fe_2O_3$ in an amount from about 2.5 to about 10 atomic percent and more preferably about 5 atomic percent.

Sodium or lithium sources include, but are not limited to, $LiH_2PO_4$, $NaH_2PO_4$, $Li_2CO_3$, $LiOH$, $LiNO$, $Li_3PO_4$, $LiPO_3$, lithium oxalate and lithium polyacrylate. Sources containing both the sodium or lithium and the phosphate can serve as both the lithium (or sodium) source and the phosphate source. For example $LiH_2PO_4$ can be used in the reaction as both the lithium source and the phosphate source. In addition some starting materials can serve as both the source of the phosphate and the source of the metal ion. By way of example, $Fe_3(PO_4)_2 \cdot 8H_2O$ can serve as a metal ion source (Fe) and as the phosphate source.

The phosphate source can be part of the sodium or lithium source or can include, but are not limited to, $NH_4H_2PO_4$ and $(NH_4)_2PO_4$.

The metal oxides are more specifically oxides of Fe, Co and Mn and include, but are not limited to, $Fe_2O_3$, $Co_3O_4$, $Mn_2O_3$, $Fe_3O_4$, $FeO$, $CoO$, $MnO_2$ and $MnO$.

Sources of Mg ion include, but are not limited to, magnesium hydroxide, magnesium carbonate, magnesium acetate, and magnesium oxide.

Sources of Ca ion include, but are not limited to calcium hydroxide, calcium carbonate, calcium acetate, calcium oxide, calcium phosphate, calcium carbide, calcium citrate tetrahydrate and $Ca(NO_3)_2$.

Sources of Zn ion include, but are not limited to, zinc hydroxide, zinc carbonate, zinc acetate, zinc oxide, zinc phosphate, zinc powder and zinc citrate dehydrate.

Sources of Ni ion include, but are not limited to, nickel carbonate, nickel acetate, nickel oxides, nickel hydroxide and nickel oxalate.

Sources of Co ion include, but are not limited to, cobalt acetate, cobalt oxide, $Co(OH)_2$ and cobalt oxalate Sources of Cu ion include, but are not limited to, copper (II) acetate, copper (II) carbonate, and copper (II) oxide.

Sources of Al ion include, but are not limited to, aluminum hydroxide, aluminum carbonate, aluminum acetate and aluminum oxide.

Sources of B ion include, but are not limited to, boron hydroxide, boron oxide, $B_2O_3$, and boron phosphate.

Sources of Cr ion include, but are not limited to, chromium acetate, chromium oxide, $Cr_2O_3$ and chromium acetylacetonate.

Sources of Nb ion include, but are not limited to, $Nb_2O_5$ and $Nb(OC_6H_5)_5$.

The lithium or sodium compound, the metal compounds and the phosphate compounds are mixed in a proportion which provides the stated nominal general formula. The starting materials are placed in a carbonaceous vessel, and then ball milled to produce a milled mixture. The milled mixture is then heated in an inert atmosphere, whereby the lithium (or sodium) ion, metal ions from the metal compounds and phosphate combine to form the $AMI_{1-x}MII_xPO_4$ product. The materials so formed are then cooled at a fixed rate.

The term milling as used in the Examples refers to ball milling, a conventional method, known to those skilled in the art. As used throughout the rest of the specification and in the claims, the term is meant to encompass processes similar to ball milling which would be recognized by those with skill in the art. For instance, the starting materials can be blended together, put in a commercially available muller and then the materials are mulled. Alternatively, the materials are mixed in water or acetone by high shear, and/or using a pebble to mix the materials in slurry form. The materials are then dried using a spray drying technique.

The materials are milled for about 8 to about 48 hours, preferable from about 12 hours to about 24 hours and more preferably about 12 hours. The period of time needed for milling is dependent upon the intensity of the milling for instance in smaller equipment the period of time needed for milling is longer then would be required in industrial milling equipment.

The reaction takes place in an inert atmosphere, such as nitrogen ($N_2$) or argon (Ar). The reaction temperature ranges from about 650° C. to about 1000° C., preferably from about 700° C. to about 900° C. and more preferably at about 750° C. The heating period is from about 4 hours to about 48 hours, preferably from about 4 to about 24 hours and more preferably from about 4 hours to about 8 hours and most preferably about 4 hours. The heating rate is typically about 2° C. per minute.

The reaction temperature and heating period are chosen to be sufficient for the reactants to react according to, for example, the following reaction:

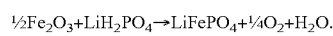

$$\tfrac{1}{2}Fe_2O_3 + LiH_2PO_4 \rightarrow LiFePO_4 + \tfrac{1}{4}O_2 + H_2O.$$

Since the reaction occurs in an inert atmosphere, devoid of oxygen, it is believed, without being limited thereto, that the generation of this partial pressure of oxygen is important to the formation of the olivine phase material $LiFePO_4$. It is believed that the generation of this partial pressure of oxygen at a proper temperature provides the active energy for the oxide transferring the metal ion to the phosphate. Ellingham has established a relationship between the pressure of the $O_2$ and temperature. For example by adding the magnesium compound to the reaction there is less oxygen to remove from the $Fe_2O_3$. For a compound which contains $Fe_{0.95}Mg_{0.5}$ by addition of the Mg there is 5% less oxygen to remove. This means that there is a smaller generated partial pressure of oxygen and according to Ellingham the reduction can therefore take place at a lower temperature.

Preferably the materials after they are heated over the reaction are then cooled slowly at a fixed rate. Preferably the materials are cooled at a rate of about 2° C. per minute to about 3° C. per minute. More preferably the materials are cooled at a rate of 2° C. per minute The vessel used for milling in the above embodiment is made of a carbonaceous material. A carbonaceous material as used herein means a material made of a carbon containing material or of a hydrocarbon containing material. Examples of typical vessels made of carbonaceous materials are vessels made of polymeric or plastic materials, including, but not limited to polypropylene, HDPE or the polymeric materials disclosed in U.S. Pat. No. 6,528,033 B1. Without being limited hereby it is believed in theory that when the starting materials are milled in the carbonaceous vessel, that there is an abrasion of the vessel wall which abrasion acts as an in situ introduction of small quantities of carbon or hydrocarbon materials into the milled mixture. The introduction of a source of carbon or hydrocarbon into the reactant mixture, adds a sufficient amount of carbon or hydrocarbon material, for the carbonaceous material to act a reducing agent in the reaction. Yet only a low percentage of carbon or hydrocarbon is added so that the materials formed have a minimum amount of residual carbon. The materials produced by the method of the present invention contain residual carbon in an amount from about 0.05 weight percent to about 3 weight percent, preferably from about 0.5 to about 1 weight percent and more preferably about 0.5 weight percent.

As used herein the term "vessel" refers to any size or shape container suitable for carrying out the milling process.

In a preferred embodiment this invention relates to a method of preparing $LiFe_{1-x}Mg_xPO_4$. In general, $Fe_2O_3$ was mixed with $LiH_2PO_4$ and $Mg(OH)_2$ in acetone in a carbonaceous vessel and ball milled to produce a milled mixture. The milled mixture was then fired under $N_2$ at 700–850° C. for 4 hours to 24 hours.

The following is a list of additional definitions of various terms used herein:

As used herein "battery" refers to a device comprising one or more electrochemical cells for the production of electricity. Each electrochemical cell comprises an anode, cathode, and an electrolyte.

As used herein the terms "anode" and "cathode" refer to the electrodes at which oxidation and reduction occur, respectively, during battery discharge. During charging of the battery, the sites of oxidation and reduction are reversed.

As used herein the tern "nominal formula" or "nominal general formula" refers to the fact that the relative proportion of atomic species may vary slightly on the order of 2 percent to 5 percent, or more typically, 1 percent to 3 percent.

As used herein the words "preferred" and "preferably" refer to embodiments of the invention that afford certain benefits under certain circumstances. Further the recitation of one or more preferred embodiments does not imply that other embodiments are not useful and is not intended to exclude other embodiments from the scope of the invention.

The following is a list of abbreviations and the corresponding meanings as used interchangeably herein:

C/5 rate=5 hour rate
C/number=cycling rate
DMC=dimethyl carbonate
EC=ethylene carbonate
g=grams
HDPE=high density polyethylene
mA=milliamp
$mAh/g=mAhg^{-1}$=milliamp hours per gram
XRD=x-ray diffraction
° C.=degrees Celsius The following Examples are intended to be merely illustrative of the present invention, and not limiting thereof in either scope or spirit. Those with skill in the art will readily understand that known variations of the conditions and processes described in the Examples can be used to synthesize the compounds of the present invention.

Unless otherwise indicated all starting materials and equipment employed were commercially available.

EXAMPLE 1

Preparation of Lithium Iron Phosphate ($LiFePO_4$)

Fe (III) oxide ($Fe_2O_3$) (11.5239 g, Aldrich 99+%)was mixed with $LiH_2PO_4$ (15 g, Aldrich 99%) in acetone and ball milled, using zirconia milling media in a Nalgene bottle (HDPE or polypropylene, Nalg-Nunc International). After 30–48 hours milling, nitrogen ($N_2$) is flushed through the bottle to remove the acetone. The dried mixture was ball milled again for a few hours and then pelletized. The pellets were fired under a nitrogen atmosphere. The firing temperature ranged from about 700° C. to about 850° C. The firing time ranged from about 4 hours to about 24 hours.

FIG. 1 shows the XRD for this phosphate product, indicating that the product formed is an olivine phase.

EXAMPLE 2

Preparation of $LiCoPO_4$ $LiCoPO_4$ was prepared using the methodology of Example 1 replacing the $Fe_2O_3$ with the corresponding amount of $CO_3O_4$.

Alternatively the $LiCoPO_4$ can be prepared according to the methodology of Example 1 replacing the $Fe_2O_3$ with the corresponding amount of $Li_2CO_3$ and the $LiH_2PO_4$ is replaced by a corresponding amount of $NH_4H_2PO_4$.

EXAMPLE 3

Preparation of $LiMnPO_4$ $LiMnPO_4$ can be prepared according to the methodology of Example 1 replacing the $Fe_2O_3$ with the appropriate amount of $Mn_2O_3$.

EXAMPLE 4

Preparation of $LiFe_{0.95}Mg_{0.05}PO_4$

A partial amount of the $Fe_2O_3$ used in Example 1 can be replaced with a magnesium compound, such as $Mg(OH)_2$, $MgCO_3$, or MgO. For example $Fe_2O_3$ (10.9477 g, Aldrich, 99+%) was mixed with $LiH_2PO_4$ (15 g, Aldrich, 99%) and $Mg(OH)_2$ (0.4167 g, Alfa, 95–100.5%) in acetone and ball milled in a Nalgene bottle (HDPE or polypropylene, Nalg-Nunc International). The milling and firing conditions are as described in Example 1.

FIG. 2 is the XRD for the magnesium doping phosphate product. The XRD indicates that the product is in an olivine phase and is a highly pure compound.

EXAMPLE 5

Preparation of $LiMn_{0.9}Mg_{0.1}PO_4$

A mixture of $Mn_2O_3$ (10.3579 g, Alfa 98%), $LiH_2PO_4$ (15 g, G Frederick Smith Chemicals) and $Mg(OH)_2$ (0.8333 g, Alfa 95–100.5%) was ball milled in acetone, using zirconia milling media in a Nalgene bottle (HDPE or polypropylene, Nalg-Nunc International). After 30–48 hours of milling the bottle was flushed with nitrogen to remove the acetone. The dried mixture was milled again for a few hours and then pelletized. The pellets were fired under a nitrogen atmosphere. The firing temperature is set from 650° C. to 950° C. and the firing time was from 4 hours to 48 hours, preferably 4 hours at 750° C.

Figure 3:
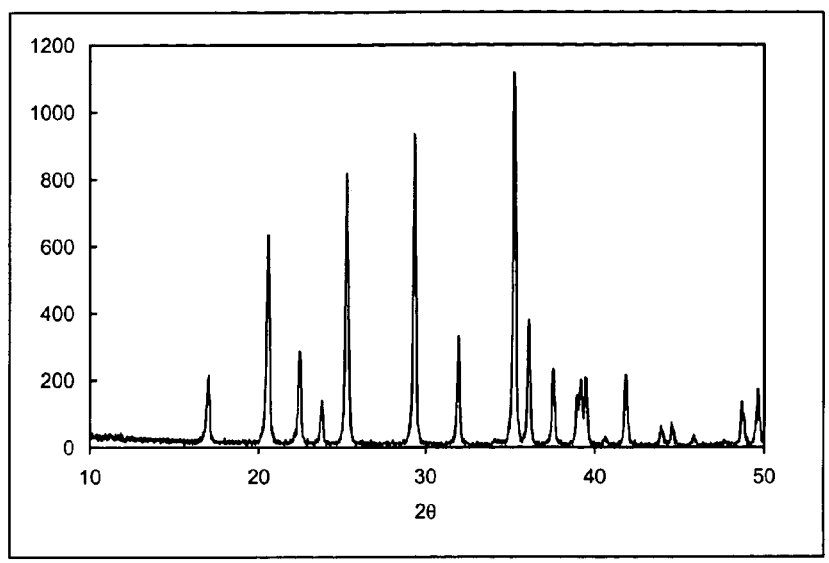
FIG. 3 is the XRD of $LiMn_{0.9}Mg_{0.1}PO_4$ produced by the method of the present invention.
Figure 4:
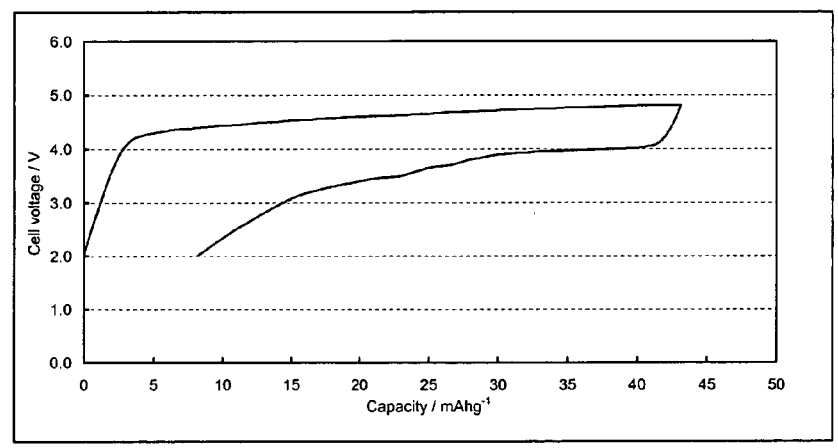
FIG. 4 is the charge and discharge curves of a lithium ion cell employing a cathode made of the active material $LiMn_{0.9}Mg_{0.1}PO_4$ produced by the method of the present invention.

FIG. 3 is the XRD of $LiMn_{0.9}Mg_{0.1}PO_4$ and FIG. 4 is the charge discharge curves of a $LiMn_{0.9}Mg_{0.1}PO_4$ cathode in a lithium ion cell. The cycling rate was C/24 and the reversible capacity is around 40 mAh/g.

A partial amount of the $Mn_2O_3$ can be replaced with other transition metal oxides, such as Fe (III) and Co (II and III) oxides to prepare $Li_{1-x-y}Fe_xCo_yPO_4$

EXAMPLE 6

Preparation of $LiMn_{0.9}Fe_{0.05}Co_{0.05}PO_4$

A mixture of $Mn_2O_3$ (10.3579 g, Alfa 98%), $LiH_2PO_4$ (15 g, G Frederick Smith Chemicals), $Fe_2O_3$ (0.5762 g, Aldrich 99+%) and $Co_3O_4$ (0.5734 g, UM) was mixed in acetone and ball milled in a Nalgene bottle (HDPE or polypropylene, Nalg-Nunc International). The milling and firing conditions were the same as in Example 5.

Figure 5:
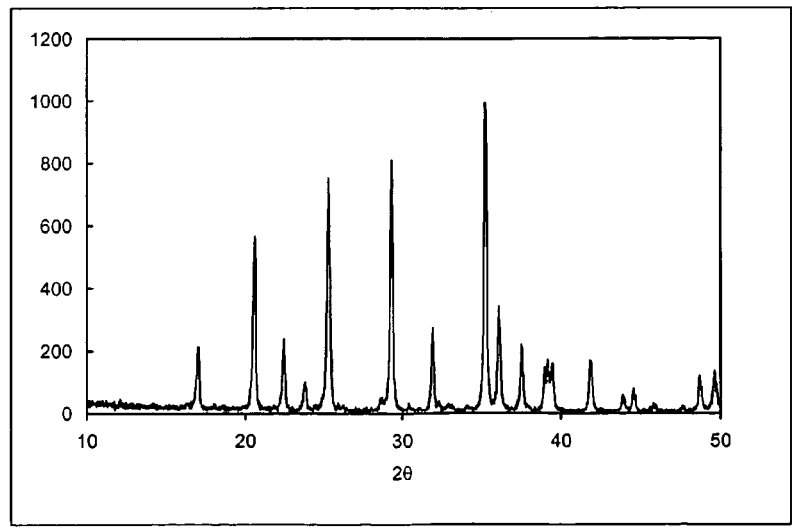
FIG. 5 is the XRD of $LiMn_{0.9}Fe_{0.05}Co_{0.05}PO_4$ produced by the method of the present invention.

FIG. 5 is the XRD of $LiMn_{0.9}Fe_{0.05}Co_{0.05}PO_4$ produced by this process.

EXAMPLE 7

Preparation of $LiCo_{2/3}Mg_{1/3}PO_4$

A mixture of $Co_3O_4$ (5 g, Alfa 99.7%), $LiH_2PO_4$ (9.8092 g, Aldrich 99%), and $Mg(OH)_2$ (1.8535 g, Alfa 95–100.5%) was ball milled as described in Example 5. After firing at 750° C. for 12 hours a pure olivine phase was obtained.

The compounds produced by the above described methodology find use as active materials for electrodes in ion batteries and more preferably in lithium ion batteries. The metal phosphates and mixed metal phosphates produced by the present invention are useful as active materials in electrodes of batteries, and more preferably are useful as active materials in positive electrodes (cathodes). When used in the positive electrodes of lithium ion batteries these active materials reversibly cycle lithium ions with the compatible negative electrode active material.

The lithium metal phosphates and lithium mixed metal phosphates prepared by the method of the present invention were used to formulate a cathode electrode. The electrode was fabricated by solvent casting a slurry of the lithium metal phosphate (or lithium mixed metal phosphate), conductive carbon, binder, plasticizer and solvent. The conductive carbon used was Super P (MMM Carbon, Ensaco, Belgium). Kynar Flex 2801® was used as the binder and electronic grade acetone was used as a solvent. The slurry was cast on to aluminum foil and a cathode was obtained as the solvent was evaporated. The cathode typically contains from about 15 mg/cm$^2$ to about 18 mg/cm$^2$ active material. Thus the proportions are as follows on a percent weight basis: from about 85 to about 86% active material; from about 4 to about 5% Super P carbon; and about 10% binder.

The active material of the compatible counter electrodes is any material compatible with the lithium metal phosphates or lithium mixed metal phosphates of the materials of the present invention. The negative electrode can be made from conventional anode materials known to those skilled in the art. The negative electrode can be comprised of a metal oxide, particularly a transition metal oxide, metal chalcogenide, carbon, graphite, and mixtures thereof.

A lithium metal phosphate cathode was prepared in a ratio of 86 weight percent of the phosphate as synthesized by the present method, 4 weight percent of Super P and 10 weight percent PVDF binder (Kynar Flex 2801®). These components were mixed in acetone and the resulting slurry was caste on Al foil. A disc electrode was made from the coated Al foil. Its area was 2.85 cm$^2$. The active loading was around 15 mg.cm$^2$. Cells were constructed by using this disc cathode and a Li metal anode with glass-fiber film as a separator. The electrolyte used was 1M $LiPF_4$ dissolved in EC and DMC (2:1 ratio by weight). The cells were tested at a constant current between cut-off voltages 3.9 V and 2.5V. The current used was 1 mA, corresponding to a rate from C/5–C/7. The $LiFe_{0.95}Mg_{0.05}PO_4$ cathode yields a reversible capacity of 145 mAhg$^{-1}$.

A cathode was prepared as in the previous paragraph substituting $LiFe_{0.9}Mg_{0.1}PO_4$ as the lithium metal phosphate. A graphite counter electrode was prepared for use with this cathode. In this case the area of the cathode was 14.72 cm$^2$. The graphite anode was made from MCMB (Osaka Gas, Limited, Japan), by casting a slurry in the ratios: 90 wt % MCMB, 3 wt % super P and 7% PVDF, on Cu foil. Li ion cells were tested at a rate of C/2 and cycled between 4.2 and 2.5 V. The discharge capacity of $LiFe_{0.9}Mg_{0.1}PO_4$ was around 130 mAhg$^{-1}$, and 87% of the initial capacity remains after 400 cycles.

A typical laminated battery in which such material can be employed includes, but is not limited to batteries disclosed in the above listed patent. For example a typical bi-cell can comprise a negative electrode, a positive electrode and an electrolyte/separator interposed between the counter electrodes. The negative and positive electrodes each include a current collector. The negative electrode comprises an intercalation material such as carbon or graphite or a low voltage lithium insertion compound, dispersed in a polymeric binder matrix, and includes a current collector, preferably a copper collector foil, preferably in the form of an open mesh grid, embedded in one side of the negative electrode. A separator is positioned on the negative electrode on the side opposite of the current collector. A positive electrode comprising a metal phosphate or mixed metal phosphate of the present invention is positioned on the opposite side of the separator from the negative electrode. A current collector, preferably an aluminum foil or grid, is then positioned on the positive electrode opposite the separator. Another separator is positioned on the side opposite the other separator and then another negative electrode is positioned upon that separator. The electrolyte is dispersed into the cell using conventional methods. In an alternative embodiment two positive electrodes can be used in place of the two negative electrodes and then the negative electrode is replaced with a positive electrode. A protective bagging material can optionally cover the cell and prevent infiltration of air and moisture. U.S. Pat. No. 6,528,033 B1, Barker et al. is hereby incorporated by reference.

The electrochemically active compounds of the present invention can also be incorporated into conventional cylindrical electrochemical cells as such as described in U.S. Pat. No. 5,616,436, U.S. Pat. No. 5,741,472 and U.S. Pat. No. 5,721,071 to Sonobe et al. Such cylindrical cells consist of a spirally coiled electrode assembly housed in a cylindrical case. The spirally coiled electrode assembly comprises a positive electrode separated by a separator from a negative electrode, wound around a core. The cathode comprises a cathode film laminated on both sides of a thick current collector comprising a foil or wire net of a metal.

An alternative cylindrical cell as described in U.S. Pat. No. 5,882,821 to Miyasaka can also employ the electrochemically active materials produced by the method of the present invention. Miyasaka discloses a conventional cylindrical electrochemical cell consisting of a positive electrode sheet and a negative electrode sheet combined via a separator, wherein the combination is wound together in spiral fashion. The cathode comprises a cathode film laminated on one or both sides of a current collector.

The active materials produced by the method of the present invention can also be used in an electrochemical cell such as described in U.S. Pat. No. 5,670,273 to Velasquez et al. The electrochemical cell described therein consists of a cathode comprising an active material, an intercalation based carbon anode, and an electrolyte there between. The cathode comprises a cathode film laminated on both sides of a current collector.

In summary the invention provides compounds of the formula $AMPO_4$ or $AMI_{1-x}MII_xPO_4$ prepared by a new method which are adaptable to commercial scale production. The compounds are olivine compounds as demonstrated by XRD analysis. Mixed metal phosphates such as $LiFe_{1-x}Mg_xPO_4$ show higher purity and higher conductivity than the metal phosphates such as $LiFePO_4$ compounds when used as electrode active materials. The method of the present invention is an improvement over the method for preparing these compounds as disclosed in U.S. Pat. No. 6,528,003 B1 in that no additional carbon is added directly to the starting materials in an amount sufficient for the carbon to act as a reducing agent for a metal ion. In the method of this invention, for example the Fe in the precursor $Fe_2O_3$ used in the preparation of $LiFePO_4$ has a +3 oxidation state and is reduced to oxidation state +2 in the product without the direct addition of a reducing agent such as carbon to the reaction mixture.

While this invention has been described in terms of certain embodiments thereof, it is not intended that it be limited to the above description. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for making a metal phosphate of the formula $AMPO_4$, wherein A is Li or Na and wherein M is selected from the group consisting of Fe, Co and Mn, comprising milling in a carbonaceous vessel a Li or Na source, a phosphate source and a metal source wherein the metal source contains an ion of Fe, Co or Mn, wherein the metal ion is capable of being reduced in oxidation state, to produce a milled mixture, and heating the milled mixture in an inert atmosphere for a period of time and at a temperature sufficient to produce a metal phosphate of the formula $AMPO_4$ wherein the oxidation state of at least one metal ion is reduced without the direct addition of a reducing agent to the reactants.

2. A method according to claim 1 wherein the Li source and the phosphate source is $LiH_2PO_4$.

3. A method according to claim 2 wherein the metal phosphate is LiFePO4, and wherein the Fe source is $Fe_2O_3$.

4. A method according to claim 2 wherein the metal phosphate is LiCoPO4, and wherein the Co source is $Co_3O_4$.

5. A method according to claim 2 wherein the metal phosphate produced is LiMnPO4 and wherein the Mn source is $Mn_2O_3$.

6. A method according to claim 1 wherein the inert atmosphere is N2 or argon.

7. A method according to claim 1 wherein the temperature the milled mixture is heated at is from about 600° C. to about 1000° C.

8. A method according to claim 7 wherein the temperature is from about 700° C. to about 850° C.

9. A method according to claim 7 wherein the reactants are heated for a period of time from about 4 hours to about 48 hours.

10. A method according to claim 1 wherein the carbonaceous vessel is made of polypropylene or HDPE.

11. A method for making a mixed metal phosphate of the formula $AMI_{1-x}MII_{1-x}PO_4$ wherein A is selected from the group consisting of Li, Na and mixtures thereof, MI is selected from the group consisting of Fe, Co, Mn and mixtures thereof, MII is selected from the group consisting of Mg, Ca, Zn, Ni, Co, Cu, Al, B, Cr, Nb, and mixtures thereof, and x is from about 0.01 to about 0.15, comprising milling in a carbonaceous vessel a lithium source, a phosphate source, a metal compound, wherein the metal compound contains an ion of Fe, Co, or Mn and a second metal compound wherein the metal of the second metal compound is selected from the group consisting of Mg, Ca, Zn, Ni, Co, Cu, Al, B, Cr, Nb and mixtures thereof, wherein at least one of the metal ions of the metal compounds is capable of being reduced, to produce a milled mixture and heating the milled mixture in an inert atmosphere for a period of time and at a temperature sufficient to produce $AMI_{1-x}MII_xPO_4$ wherein at least one metal ion has been reduced without full reduction to elemental state without the direct addition of a reducing agent.

12. A method according to claim 11 wherein the lithium source and the phosphate source is $LiH_2PO_4$.

13. The method according to claim 12 wherein the metal oxide is iron oxide, cobalt oxide or manganese oxide.

14. The method according to claim 13 wherein the mixed metal phosphate produced is $LiFe_{1-x}Mg_xPO_4$.

15. The method according to claim 13 wherein the mixed metal phosphate produced is $LiCo_{1-x}Mg_xPO_4$.

16. The method according to claim 13 wherein the mixed metal phosphate is $LiMn_{1-x}Mg_xPO_4$.

17. The method according to claim 11 wherein the Mg compound is selected from the group consisting of magnesium hydroxide, magnesium carbonate, magnesium acetate and magnesium oxide.

18. The method according to claim 11 wherein the reactants are heated from about 600° C. to about 1000° C.

19. The method according to claim 18 wherein the temperature is from about 700° to about 850° C.

20. The method according to claim 19 wherein the reactants are heated from about 4 hours to about 48 hours.

* * * * *